H. A. MARK.
PROCESS FOR WASHING AND SEPARATING MATERIALS.
APPLICATION FILED SEPT. 10, 1917.
1,269,947.
Patented June 18, 1918.
2 SHEETS—SHEET 1.
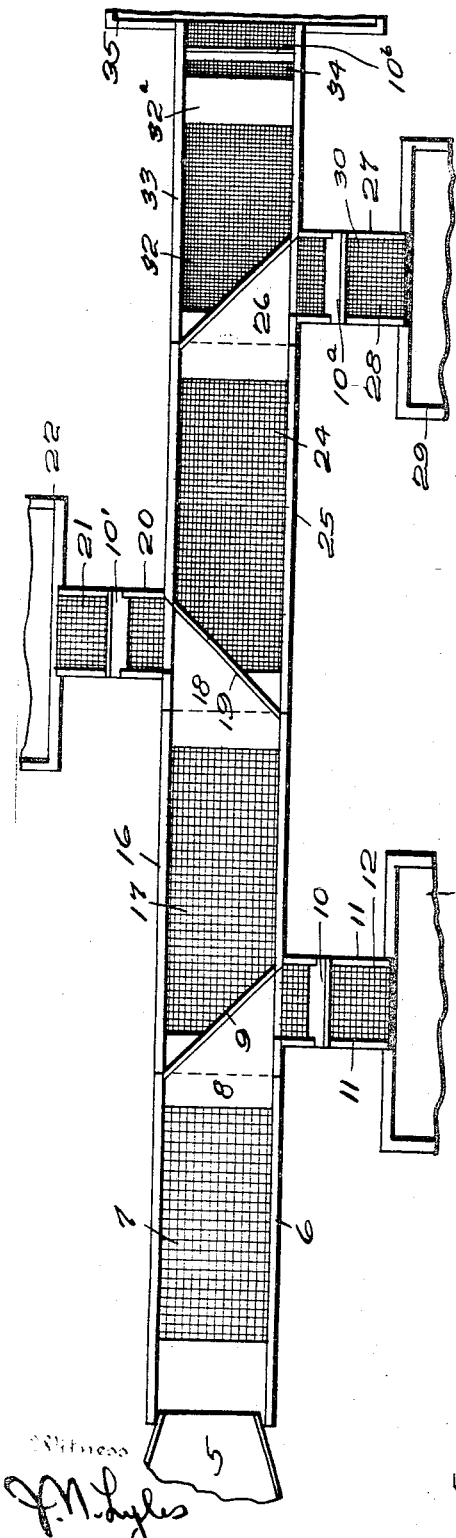
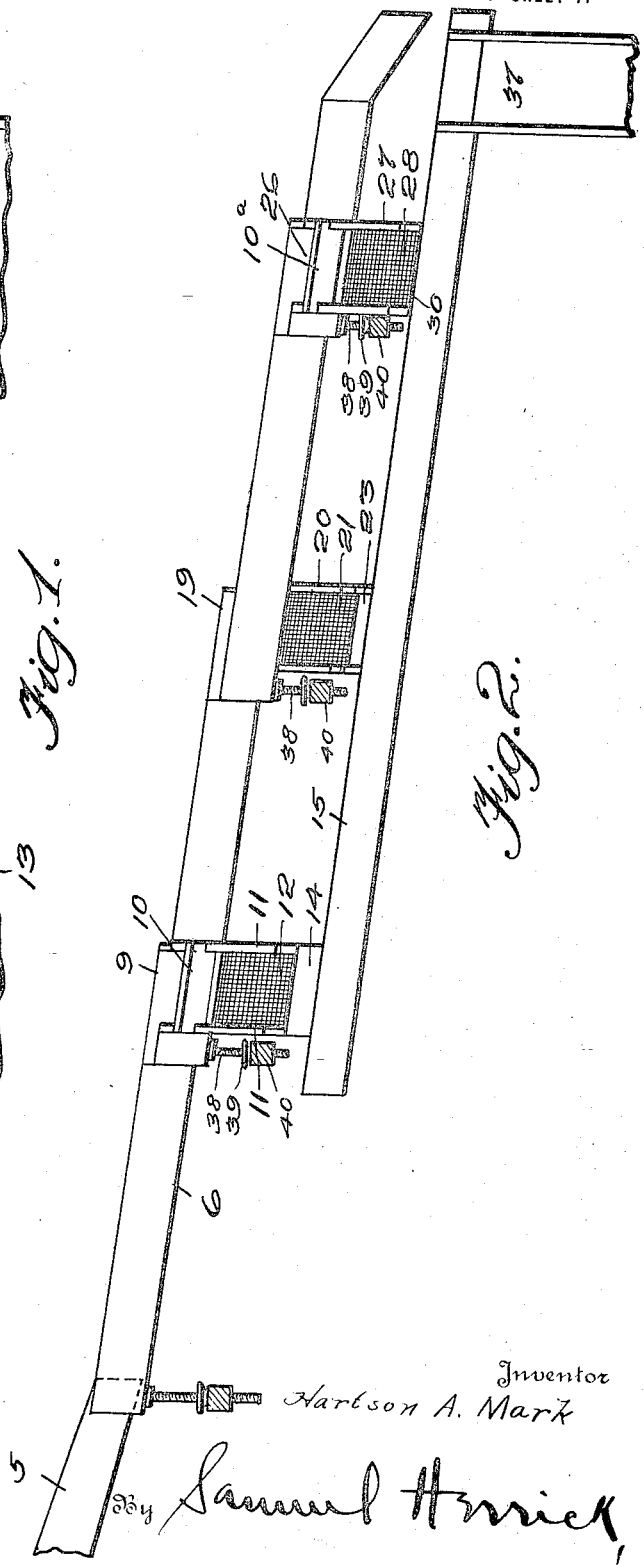

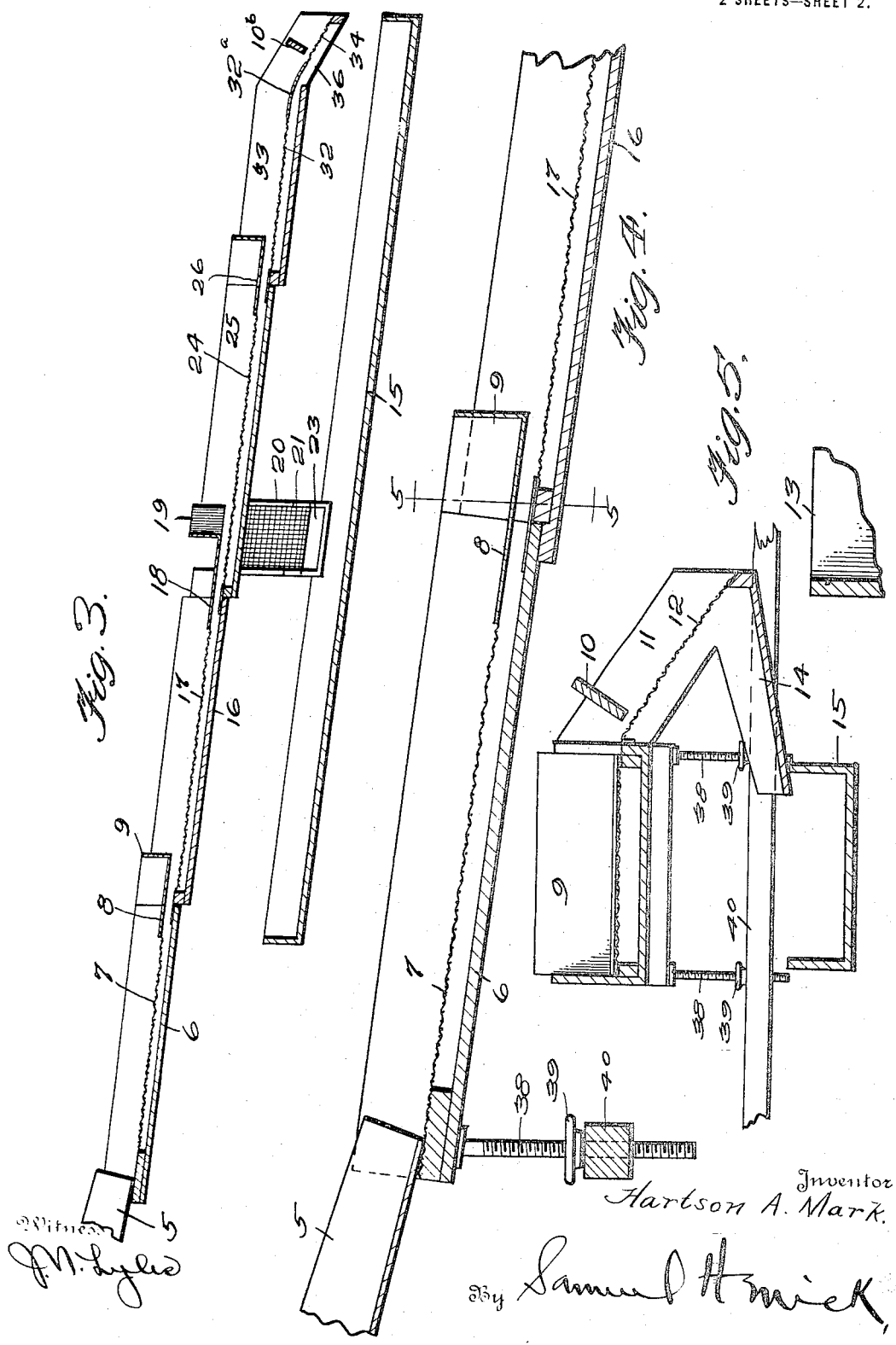

UNITED STATES PATENT OFFICE.

HARTSON A. MARK, OF OSHKOSH, NEBRASKA.

PROCESS FOR WASHING AND SEPARATING MATERIALS.

1,269,947.

Specification of Letters Patent.   Patented June 18, 1918.

Application filed September 10, 1917. Serial No. 190,544.

*To all whom it may concern:*

Be it known that I, HARTSON A. MARK, a citizen of the United States, residing at Oshkosh, in the county of Garden and State of Nebraska, have invented certain new and useful Improvements in Processes for Washing and Separating Materials, of which the following is a specification.

This invention relates to a washing and screening or separating device and its object is to provide an apparatus by means of which heavier than water solids such as broken stone, gravel, sand or the like may be readily and economically separated into piles of varying sizes and washed where washing is needed.

Further objects and advantages of the invention will be set forth in the detailed description which now follows:

In the accompanying drawing:

Figure 1 is a plan view of a washing and separating apparatus constructed in accordance with the invention.

Fig. 2 is a side elevation thereof.

Fig. 3 is a longitudinal, vertical section.

Fig. 4 is a fragmentary, longitudinal section upon an enlarged scale.

Fig. 5 is a transverse, vertical section upon line 5—5 of Fig. 4.

Like numerals designate corresponding parts in all of the figures of the drawing.

Referring to the drawing, the numeral 5 designates a flume or trough through which a flow of water is maintained. The material to be washed or washed and screened or merely screened is initially placed in the trough 5 and is washed by the water from the trough into a trough 6. The trough 6 is spanned by a screen 7 and the material initially lands upon this screen. The finer material passes through the screen 7 while the coarser material is carried along the upper surface of the screen 7 by the action of the water. Such of the material as is too coarse to pass through the screen 7 finally lands upon a deflector 8 of imperforate material and this deflector is provided at its lower end with an oblique upstanding edge 9 by which the material is deflected laterally. In practice this deflector may be made of any dimensions either in advance of the edge 9 or beyond the same. The water passes from the deflector 8 with considerable speed and it is therefore desirable to provide a baffle-plate 10 in order to avoid the necessity of providing a screen of great length at this point. This baffle-plate 10 is supported from the side walls 11 of a chute and this chute is spanned by a screen 12. The screen 12 conducts the material and discharges it into a bin indicated at 13.

The water that it discharged laterally from the deflector 8 passes through the screen 12 and is directed by a spout 14 into a waste trough 15, the latter extending longitudinally beneath the line of troughs and screens.

Such of the material as passes the screen 7 and falls into the trough 6 is carried by the action of the water into a second trough 16. The trough 16 is spanned by a screen 17 and such of the material as is fine enough to pass through the meshes of the screen 17 enters the space between said screen and the bottom of the trough 16, while such of the material as is too coarse to pass through the screen 17 is carried by the action of the water along screen 17 and upon a deflector 18 having an upstanding edge 19 by which the material is deflected laterally into a trough 20. This trough corresponds in function to trough 11 and is provided with a baffle-plate 10' corresponding in function to the baffle-plate 10. The trough 20 is spanned by a screen 21 from which the material is discharged into a bin 22, while the water that passes through the screen 21 is conducted by a trough 23 back to the waste trough 15.

Such of the material as passes through screen 17 is carried along the bottom of the trough 16 by the action of the water and is discharged upon a screen 24, this screen spanning a trough 25, the latter having at its lower end a deflector 26 corresponding in function to the deflectors 8 and 18. The deflector 26 discharges the material into a trough 27 that is spanned by a screen 28 and carries a baffle-plate 10$^a$. The screen 28 discharges the material into a bin or other suitable receptacle 29 while the water that passes through the screen 28 is carried by a trough 30 back into the waste trough 15.

The material that passes through the screen 24 is carried along the bottom of trough 25 and is discharged upon a screen 32 that spans a trough 33 and is discharged from an inclined screen 34 provided with a baffle-plate 10$^b$, that is separated from the screen 32 by an imperforate member 32$^a$, into a bin indicated at 35. The water from the trough 33 falls through an opening 36 into the waste trough 15 from which it may be conducted by a lateral trough 37 into a waste pool or if desired the water may be pumped from the trough back into the flume 5 to be used over and over again if the water is scarce or expensive.

While in the illustrated embodiment of the invention I have shown four screens 7, 17, 24 and 32 it is apparent that a larger or smaller number of screens may be employed without departure from the spirit of the invention.

The sizes of the troughs, the inclination given the same, the mesh of the screen and the height of the screens above the bottom of the troughs both at the front and rear ends thereof are matters dependent upon the size and nature of the material treated, the respective grade or sizes into which it is desired to separate the same and the quantity of water used.

It will be apparent that many mechanical expedients may be resorted to to adjust the inclination of the several troughs and screens. As merely illustrative of one form of a device that may be used to this end, I have shown in the accompanying drawing jack-screws 38 adapted to be elevated by hand-nuts 39 acting against cross bars 40. It is to be understood however, that this showing is merely to indicate that the invention contemplates the provision of means for adjusting the inclination of the several troughs and not as being in any sense a limitation to that particular form of adjusting means. Furthermore it is to be understood that the invention contemplates the adjustment of the height of the several screens above the bottoms of the trough in which they are located. This may be accomplished by the proper positioning of the screens to suit the character of work being done.

In operation, the material is fed, as before stated, into the flume 5 and is discharged upon the screen 7. The water and the finer particles of the material are carried below the screen until the carrying capacity of the trough or flume, beneath screen 7, has been reached, as far as the water is concerned; therefore an excess of fluid will flow forward above the surface of said screen, carrying, rolling and washing forward the particles of material too large to pass through the openings of the screen. When the distance from the said screen to the bottom of said trough or flume, the fall or pitch of said trough or flume, to give the water the proper speed of flow, the relative sizes and quantities of the material to be separated or washed, shall have been adjusted: there will be at all times and places a downward motion or movement of the said water through the openings of the screen. This downward movement, aided by the force acting upon falling bodies will carry through the openings of the screen all particles not too large to pass through the openings of the same and all particles too large to be carried through the meshes or openings of said screen will be moved forward over the upper surfaces thereof and onto the deflector.

In the washing of material the dirt must of necessity be of such nature as to be momentarily (at least) suspended in the water, so it can only be the particles sufficiently heavy to sink in the moving water that will be carried downward. The fine floating particles will be carried in suspension in the water, both above and below the screen, and it is this fact that requires the discharge upon an inclined screen through which the water and floating particles will pass while the material caught upon the screen will be discharged by gravity by rolling or sliding off said inclined screen.

It is to be understood that the invention is not limited to the precise construction set forth but that it includes within its purview whatever changes fairly come within the spirit of the appended claim.

Having described my invention what I claim is:

The herein described method of washing and screening materials which consists in feeding such materials, together with water, into a trough spanned by a screen, the water being in such quantity as to travel both above and below the screen and impart a forward movement to that portion of the material which lies above the screen and laterally deflecting the material which remains above said screen and which is washed down by the water.

In testimony whereof I affix my signature in the presence of two witnesses.

HARTSON A. MARK.

Witnesses:
HERBERT J. CURTIS,
LLOYD R. LAYCOCK.